United States Patent [19]
Worrell et al.

[11] Patent Number: 5,398,568
[45] Date of Patent: Mar. 21, 1995

[54] STEERING WHEEL FOR MOTOR VEHICLE

[75] Inventors: Barry C. Worrell, Centerville; Paul M. Landis, Englewood; Larry E. Flora, Laura, all of Ohio

[73] Assignee: General Motors Corporation, Detroit, Mich.

[21] Appl. No.: 155,354

[22] Filed: Nov. 22, 1993

[51] Int. Cl.$^6$ .......................... B62D 1/04; G05G 1/10
[52] U.S. Cl. .................................. 74/552; 29/894.1
[58] Field of Search ............ 74/552, 558; 29/894.1

[56] References Cited

U.S. PATENT DOCUMENTS

| | | | |
|---|---|---|---|
| 2,732,618 | 1/1956 | Schwinn | 29/482 |
| 4,299,138 | 11/1981 | Sjoqvist | 74/552 |
| 4,627,307 | 12/1986 | Yamazawa et al. | 74/552 |
| 4,635,500 | 1/1987 | Overcashier et al. | 29/894.1 X |
| 4,662,238 | 5/1987 | Zeller | 74/552 |
| 4,736,650 | 4/1988 | Culshaw | 74/552 |
| 4,753,129 | 6/1988 | Ishida et al. | 74/552 |
| 5,085,097 | 2/1992 | Harata et al. | 74/552 |

FOREIGN PATENT DOCUMENTS

| | | | |
|---|---|---|---|
| 2583698 | 12/1986 | France | 74/552 |
| 2589118 | 4/1987 | France | 74/552 |
| 2674207 | 9/1992 | France | 74/552 |
| 1630307 | 7/1971 | Germany | 74/552 |
| 55-83667 | 6/1980 | Japan | 74/552 |
| 59-184059 | 10/1984 | Japan | 74/552 |

*Primary Examiner*—Vinh T. Luong
*Attorney, Agent, or Firm*—Saul Schwartz

[57] ABSTRACT

A motor vehicle steering wheel having a structural frame including a metal hub, a metal rim, a hollow, thin-walled metal tube having opposite distal ends rigidly connected to the rim, and a thick-walled metal sleeve disposed around a center portion of the metal tube. The metal sleeve and the center portion of the metal tube are squeezed concurrently such that each defines an oval shape in cross section in a plane perpendicular to a longitudinal centerline of the metal tube and the metal tube is mechanically interlocked with the metal sleeve. The metal sleeve is resistance welded to the metal hub whereby the metal tube on opposite sides of the metal sleeve defines a pair of low mass, hollow spokes of the structural frame and the sleeve defines a pair of spoke bases whereat the spokes are rigidly connected to the hub.

3 Claims, 2 Drawing Sheets

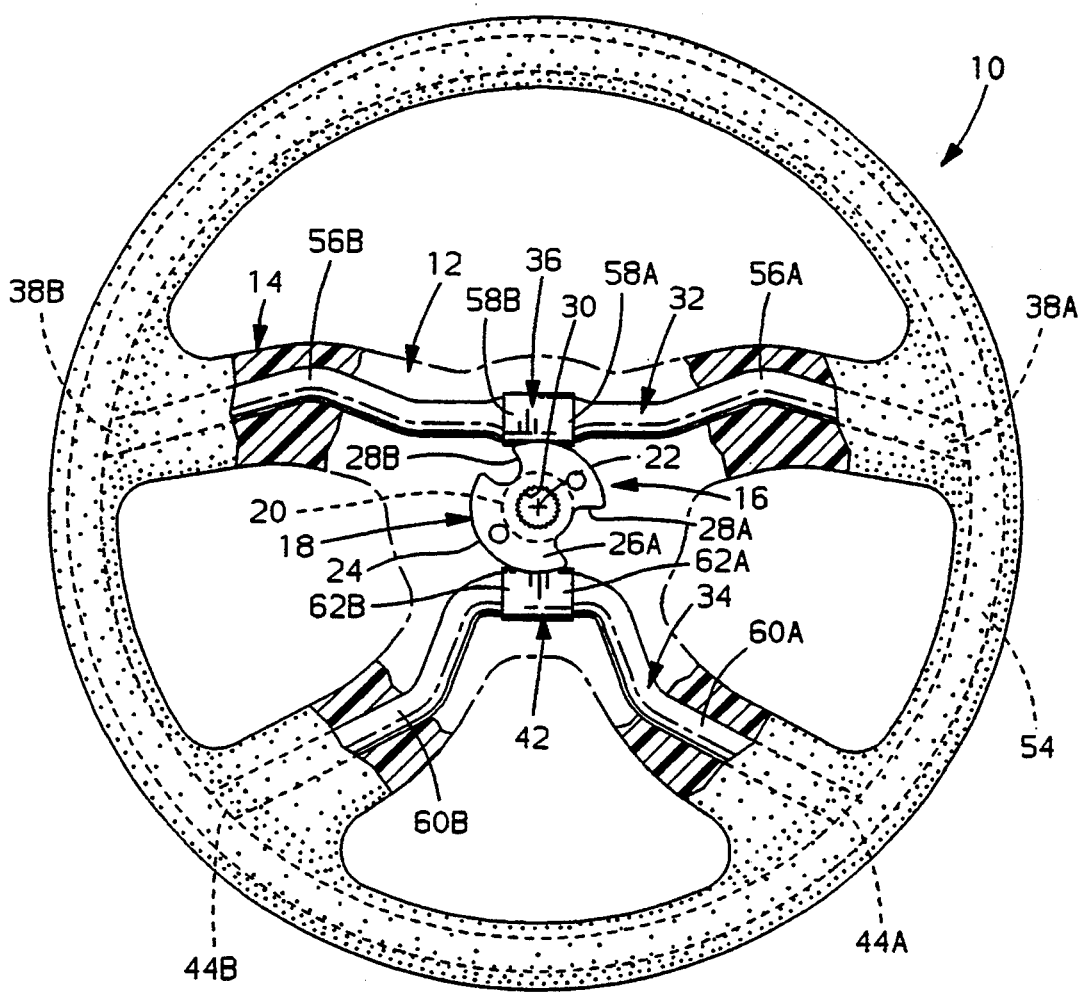
FIG. 1
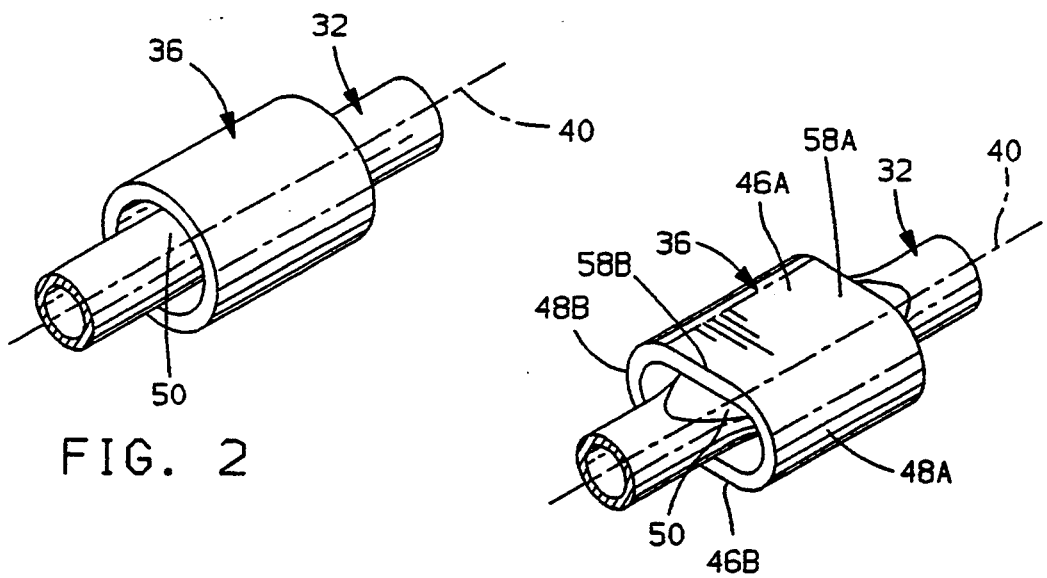
FIG. 2
FIG. 3

STEERING WHEEL FOR MOTOR VEHICLE

FIELD OF THE INVENTION

This invention relates to motor vehicle steering wheels.

BACKGROUND OF THE INVENTION

Motor vehicle steering wheels commonly include a structural metal frame or skeleton consisting of a circular rim, a solid hub adapted for rigid attachment to a steering shaft of the motor vehicle, and a plurality of spokes rigidly connected to the hub and to the rim. In many prior steering wheels, the rim and spokes are made from solid steel rods resistance welded to each other and to the hub. In other prior steering wheel proposals, the hub of the structural frame is a two-piece element defining a clamp for the solid steel spokes. In still other prior steering wheel proposals, the rim of the structural frame is made from thin-walled steel tube resistance welded to solid steel spokes. A steering wheel according to this invention has a structural frame including tubular spokes resistance welded to the hub and is an improvement over the aforesaid prior steering wheels having solid steel spokes.

SUMMARY OF THE INVENTION

This invention is a new and improved motor vehicle steering wheel having a structural frame including a metal hub adapted for rigid attachment to a steering shaft and a plurality of hollow, low mass spokes each having a thick-walled base whereat the respective spokes are resistance welded to the metal hub. The hollow spokes define minimum mass, structurally rigid spans between the hub and a rim of the structural frame and the thick-walled bases afford a greater degree of structural rigidity than the thin-walled spokes in the more sever temperature and pressure environment commonly associated with resistance welding. In a preferred embodiment, the bases of the respective spokes are defined by thick-walled steel sleeves assembled over the thin-walled spokes and deformed to effect rigid mechanical interlock with the spokes.

BRIEF DESCRIPTION OF THE DRAWINGS

FIG. 1 is a partially broken-away view of a motor vehicle steering wheel according to this invention;

FIG. 2 is a fragmentary perspective view of a portion of FIG. 1 at an intermediate stage of manufacture of the motor vehicle steering wheel according to this invention;

FIG. 3 is similar to FIG. 2 but illustrating a further intermediate stage in the of manufacture of the motor vehicle steering wheel according to this invention;

DESCRIPTION OF A PREFERRED EMBODIMENT

Figure 4:
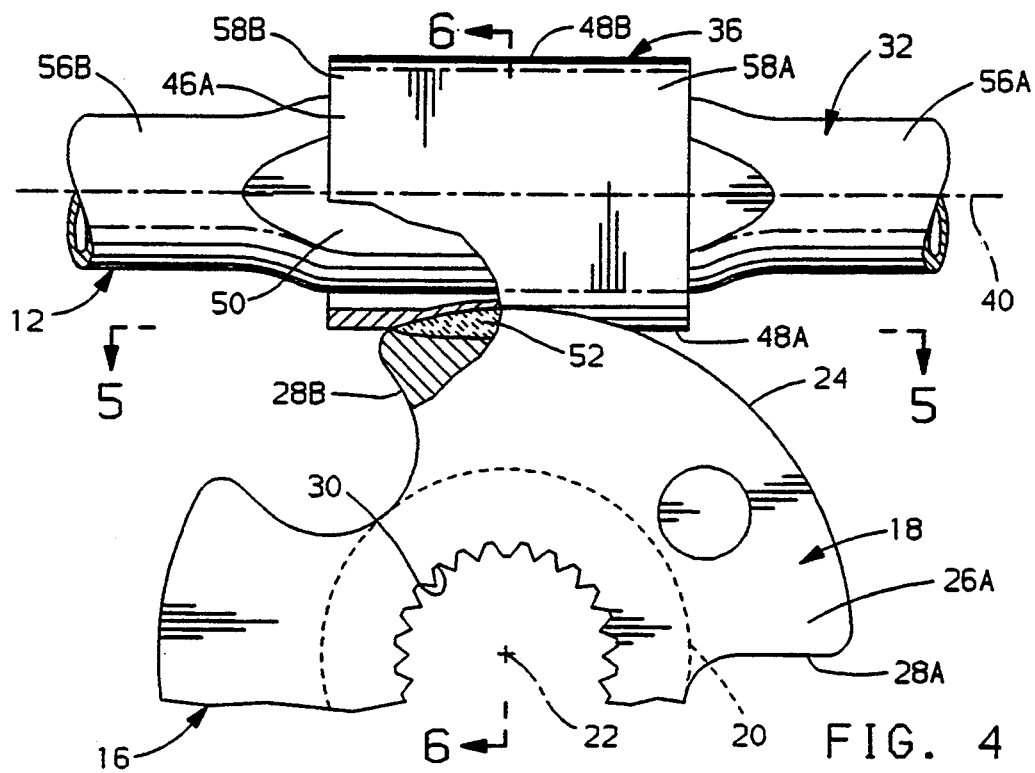
FIG. 4 is an enlarged view of a portion of FIG. 1.

Referring to FIG. 1, a motor vehicle steering wheel 10 according to this invention includes a structural frame or skeleton 12 and a schematically represented trim or cushion 14 concealing the frame. A hub 16 of the structural frame 12 is a solid, preferably die cast, metal element having a generally disc-shaped body 18 and an integral annular boss 20 symmetric about a centerline 22 of the hub.

The body 18 of the hub has a cylindrical outside wall 24 and a pair of flat end faces 26A-B in parallel planes perpendicular to the centerline 22. The body 18 is relieved by a pair of recesses 28A-B which provide access through the hub and which form no part of this invention. A bore 30 through the body 18 of the hub is symmetric about the centerline 22 and has a plurality of spline-like internal serrations which engage corresponding serrations on the end of a steering shaft, not shown, whereby the structural frame 12 of the steering wheel is rigidly connected to the steering shaft for rotation as a unit therewith.

An upper thin-walled tube 32 is disposed on one side of the hub 16 in the plane of the body 18. A lower thin-walled tube 34 is disposed in the plane of the body 18 opposite the upper tube. Each of the upper and lower tubes 32,34 is preferably made of seam welded steel tube having an outside diameter on the order of 0.406 inch and a wall thickness on the order of 0.060 inch. A first relatively thick-walled tubular sleeve 36 is disposed over the upper tube 32 about midway between a pair of distal ends 38A-B of the tube and generally symmetric about a centerline 40 thereof. The sleeve 36 is preferably made of steel and has an outside diameter on the order of 0.590 inch and a wall thickness on the order of 0.080 inch. The tube 32 and the sleeve 36 each define an annular cross section in a plane perpendicular to the centerline 40. A second relatively thick-walled tubular sleeve 42, FIG. 1, substantially identical to the sleeve 36, is similarly disposed over the lower tube 34 about midway between a pair of distal ends 44A-B thereof.

Figure 6:
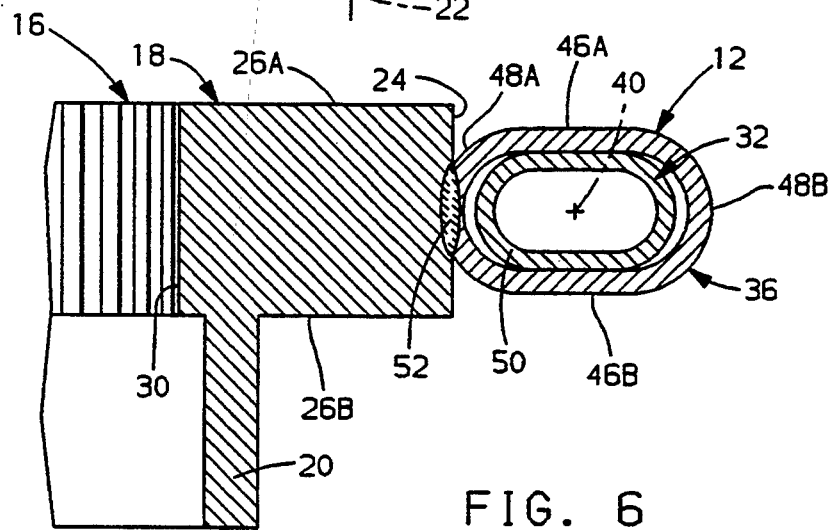
FIG. 6 is a sectional view taken generally along the plane indicated by lines 6—6 in FIG. 4.

As seen best in FIGS. 2, 3 and 6, the first sleeve 36 is installed loose over the tube 32 and then deformed by squeezing or flattening perpendicular to the centerline 40 to a generally oval shape cross section, FIGS. 1, 3 and 6, characterized by a pair of parallel flat sides 46A-B and a pair of opposite convex ends 48A-B. Because the outside diameter of the upper tube 32 corresponds generally to the inside diameter of the sleeve 36, a center portion 50 of the tube 32 is deformed in the same fashion as, and concurrently with, the sleeve 36 and a rigid mechanical interlock therebetween is effected. The second sleeve 42 and the lower tube 34 are similarly deformed and rigidly mechanically interlocked.

Figure 5:
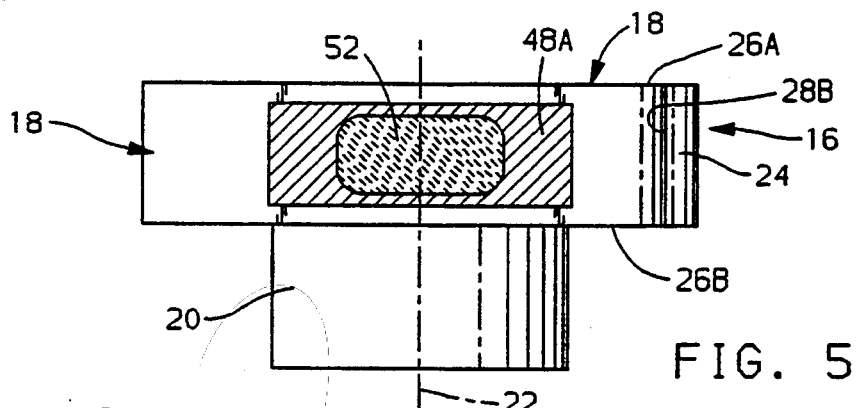
FIG. 5 is a sectional view taken generally along the plane indicated by lines 5—5 in FIG. 4.

To attach the upper tube 32 to the hub 16, the sleeve 36 and the hub 16 are oriented relative to each other such that the convex end 48A of the sleeve is tangent to the cylindrical wall 24 of the hub body and the flat sides 46A-B of the sleeve are parallel to the end faces 26A-B of the hub body. The appropriate one of the convex ends 48A-B for juxtaposition with the hub body is determined by the shape of the upper tube 32 on opposite sides of the sleeve, which shape conforms to the desired appearance of the finished steering wheel 10. The sleeve is resistance welded to the hub by forcing the convex end 48A against the cylindrical wall 24 of the hub body while inducing weld current across the interface therebetween. The heat generated by the weld current effects a fusion 52 of the sleeve and the hub body to a depth generally corresponding to the wall thickness of the sleeve, FIGS. 4-6. The second sleeve 42 on the lower tube 34 is similarly resistance welded to the hub body 18 diametrically opposite the first sleeve 36.

The respective distal ends 38A-B, 44A-B of the upper and lower tubes are joined by conventional attachment to a circular rim 54 of the structural frame 12 concealed within the trim 14 of the steering wheel 10. The upper tube 32 thus defines a pair of rigid, hollow, low mass spokes 56A-B of the structural frame each having a length equal to about one-half of the length of the upper tube 32. The first sleeve 36 defines a pair of relatively thicker spoke bases 58A-B rigidly connected to the spokes 56A-B, respectively, and having lengths equal to about one-half of the length of the first sleeve 36. The lower tube 34 and the second sleeve 42 likewise define a pair of rigid, hollow, low mass spokes 60A-B of the structural frame 12 and a pair of spoke bases 62A-B.

The relative wall thicknesses of the tubes 32,34 and the sleeves 36,42 is an important feature of this invention. The wall thickness of the tubes is calculated to afford each of the spokes 56A-B, 60A-B rigidity in beam bending commensurate with motor vehicle steering wheel applications. Because the wall thickness of the tubes 32,34 thus determined is unlikely to be sufficient to maintain the structural integrity of the tubes in the pressure and temperature environment characteristic of resistance welding, implementing low mass hollow spokes in production in place of solid rod spokes could require significant capital investment to replace resistance welding equipment. The wall thickness of the sleeves 36,42, however, is calculated to maintain structural integrity in the pressure and temperature environment characteristic of resistance welding so that by fitting the sleeves 36,42 over the tubes 32,34 and effecting a simple mechanical interlock therebetween, low mass hollow spokes can be implemented in production using existing resistance welding equipment.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A motor vehicle steering wheel comprising:
   a metal rim,
   a metal hub,
   a hollow metal tube having a first wall thickness and a pair of distal ends rigidly connected to said rim, and
   a tubular metal sleeve having a second wall thickness exceeding said first wall thickness disposed around said hollow metal tube substantially midway between said pair of distal ends thereof and mechanically deformed as a unit with said hollow metal tube to effect a rigid mechanical interlock between said hollow metal tube and said tubular metal sleeve,
   said tubular metal sleeve having a resistance weld rigid connection to said hub so that said hollow metal tube on opposite sides of said mechanically deformed tubular sleeve defines a pair of hollow spokes of said steering wheel rigidly connected to said hub through said resistance weld and through said mechanical interlock between said tubular metal sleeve and said hollow tube.

2. The motor vehicle steering wheel recited in claim 1 wherein:
   said hollow metal tube is cylindrical on opposite sides of said mechanically deformed tubular sleeve, and
   said tubular metal sleeve is cylindrical before said mechanical deformation as a unit with said hollow metal tube.

3. The motor vehicle steering wheel recited in claim 2 wherein:
   said metal rim is a hollow tubular metal rim.

* * * * *